United States Patent [19]

Hawkins

[11] 4,078,912

[45] Mar. 14, 1978

[54] FERTILIZERS CONTAINING NITRIFICATION INHIBITOR

[75] Inventor: Stanley Wallace Hawkins, Stockton-on-Tees, England

[73] Assignee: Imperial Chemical Industries Limited, London, England

[21] Appl. No.: 689,543

[22] Filed: May 24, 1976

[30] Foreign Application Priority Data

May 28, 1975 United Kingdom ............... 23340/75

[51] Int. Cl.$^2$ ................................................ C05C 9/00
[52] U.S. Cl. ............................................ 71/28; 71/27; 71/64 SC; 71/101; 47/58
[58] Field of Search ................. 71/1, 11, 7, 27, 28–30, 71/101; 260/455 B; 47/58

[56] References Cited

U.S. PATENT DOCUMENTS

| | | | |
|---|---|---|---|
| 2,766,554 | 10/1956 | Dorman et al. | 71/101 X |
| 2,795,525 | 6/1957 | Stansbury et al. | 260/455 B |
| 2,990,265 | 6/1961 | Hamm et al. | 71/101 X |
| 2,993,774 | 7/1961 | Hamm et al. | 71/101 X |
| 3,115,404 | 12/1963 | Carney | 71/7 X |
| 3,503,733 | 3/1970 | Belasco et al. | 71/27 X |
| 3,573,028 | 3/1971 | Veno et al. | 71/27 |

*Primary Examiner*—Frank A. Spear, Jr.
*Assistant Examiner*—Ferris H. Lander
*Attorney, Agent, or Firm*—Cushman, Darby & Cushman

[57] ABSTRACT

This invention provides a method for nitrification of ammonium-nitrogen in soil by treating the soil with a compound having the formula $X_2CS_3$ or XS.CS.OR wherein X is Na, K or $NH_4$ and R is alkyl. The invention also provides a fertilizer composition comprising the said compound in combination with an ammonium-nitrogen-containing fertilizer.

10 Claims, No Drawings

FERTILIZERS CONTAINING NITRIFICATION INHIBITOR

The present invention relates to a method for suppressing or inhibiting the nitrification of ammonium nitrogen present in soil and inhibiting rapid loss of ammonium nitrogen therefrom. The invention also relates to fertilizer compositions for use in the said method.

It is established practice to use fertilizers consisting of or containing ammonium-nitrogen, for example ammonia, aqueous ammonia or ammonium hydroxide solution, ammonium salts (in particular the sulphate, nitrate and phosphate) and urea. These may be applied before, after, or simultaneously with the sowing of the seed or the planting of the crop, and may be injected into the soil, sprayed upon the soil or crop, or scattered upon the soil. However, nitrification has always been, and remains, a problem. Nitrification is the process whereby ammonium-nitrogen is converted to nitrite-nitrogen and then to nitrate nitrogen. This oxidation is carried out by various microorganisms called nitrifiers in the following sequence:

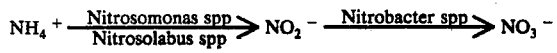

In contrast to nitrate-nitrogen, ammonium-nitrogen is adsorbed on the surface of soil colloids and is correspondingly less susceptible to rapid displacement down a soil profile by leaching. Loss of fertilizer by nitrification and leaching is both economically and environmentally undesirable. Nitrification-inhibition, by maintaining nitrogen in the less mobile ammonium form, could be an extremely valuable method of reducing such losses.

Many attempts have been made to find nitrification-inhibiting or -suppressing substances which are toxic to nitrifiers and which will inhibit or delay the conversion of $NH_4^+$ to $NO_3^-$ without, however, being toxic or having deleterious effects in other respects, and which can be handled safely and without difficulty. One substance which has been proposed for this purpose is the compound 2-chloro-6- (trichloromethyl) pyridine, developed and marketed by Dow Chemical Co. under the Registered Trade Mark "N-SERVE". Other compounds or classes of compounds which have been proposed are phenol and substituted phenols (U.S. Pat. No. 3,009,804); haloalkanes (U.S. Pat. No. 3,011,886); haloanilines (U.S. Pat. No. 3,050,381).

We have now discovered two classes of compounds, both derivatives of carbon disulphide which, when applied to the soil, liberate carbon disulphide at ambient temperature. Carbon disulphide is a highly effective nitrification inhibitor, but it is not practicable to use such a volatile, flammable and offensive substance, as such, in actual farming practice. These objections do not arise in respect to the derivatives thereof which are disclosed hereinafter, since they do not liberate carbon disulphide until after they have been applied onto or into the soil. This may be done prior to, after, or simultaneously with the application of ammonium-nitrogen (or ammonium-nitrogen-containing) fertilizers; the derivatives can be used as such, or they can be dissolved or suspended in solutions of such fertilizers; or they can be incorporated in, or on the surface of, such fertilizers in the form of solid powders, crystals, prills, granules, etc. (including mixed fertilizers of which at least one component is an ammonium-nitrogen fertilizer).

One of the two classes of derivatives mentioned hereinabove are trithiocarbonates having the formula $X_2CS_3$ wherein X is a monovalent cation, in particular Na, K or $NH_4$. These trithiocarbonates are easily prepared from simple inorganic compounds by the general reaction:

Sodium trithiocarbonate can be prepared, for example, by dissolving $CS_2$ in sodium sulphide solution, and potassium and ammonium trithiocarbonates can be similarly prepared. All these compounds are reasonably stable in the dry condition, and can therefore be incorporated in or dispersed over the surface of solid fertilizers (eg. granules) as solid additions. They are also all reasonably soluble in water, and once they are in solution (eg. in liquid fertilizers) they readily react with atmospheric carbon dioxide to liberate $CS_2$, thus inhibiting or delaying nitrification of the fertilizer.

The other suitable class of derivatives of $CS_2$ are the corresponding Xanthates, having the formula XS.CS.OR, wherein X has the same meaning as above and R is alkyl. These are typified by KS.CS.OEt, which can be prepared, for example, by dissolving $CS_2$ in alcoholic KOH.

The present invention accordingly provides a method for inhibiting or suppressing the nitrification of ammonium-nitrogen in soil and preventing rapid loss of ammonium-nitrogen therefrom, which comprises the step of treating the soil, either before or after or simultaneously with one or more ammonium-nitrogen fertilizers, or ammonium-nitrogen-containing fertilizers, with one or more nitrification-inhibiting compounds, the said compounds being members of one or both of the following classes:

(a) trithiocarbonates having the formula $X_2CS_3$
(b) xanthates having the formula XS.CS.OR
wherein X is Na, K or $NH_4$ and R is alkyl.

As indicated above, the nitrification-inhibitor may be injected into the soil or spread upon the surface of the soil. It may be used separately from the fertilizer or in combination therewith. Examples of ammonium-nitrogen fertilizer include ammonia, aqueous ammonia or ammonium hydroxide in solution, ammonium salts (such as the sulphate, nitrate and phosphate) and urea, as well as NPK fertilizers containing one or more ammonium salts and/or urea.

The invention also provides a fertilizer composition comprising one or more ammonium-nitrogen fertilizers, or ammonium-nitrogen-containing fertilizers, in admixture with one or more nitrification-inhibiting compounds, the said compounds being members of one or both of the following classes:

(a) trithiocarbonates having the formula $X_2CS_3$
(b) xanthates having the formula XS.CS.OR
wherein X is Na, K or $NH_4$ and R is alkyl.

The present invention further provides a fertilizer composition comprising at least one ammonium salt and/or urea having incorporated therein or thereon at least one of the carbon disulphide-liberating compounds deined in the immediately preceding paragraph. In one embodiment of the invention, the compound is incorporated in prills of urea or ammonium nitrate. Urea prills coated with elemental sulphur have now achieved great popularity as slow-release fertilizers, the sulphur coating permitting release of the urea at such a slow and gradual rate that the sulphur-coated urea prills need be applied to the soil only once per season. By incorporating one or more of our carbon disulphide-liberating compounds in the urea prill prior to coating with sulphur, this effect is enhanced, since not only does the sulphur coating permit the urea to be released slowly and gradually, but once the urea is released nitrification thereof is inhibited or delayed and the urea continues to act as an effective fertilizer.

In one embodiment of the present invention, there is provided a sulphur-coated urea prill, the prill containing at least one of the compounds as defined hereinabove.

Nitrification-inhibition studies using $CS_2$-releasing compounds (Series 1)

Preliminary experiments were set up on a laboratory scale, to study the effects of three compounds added individually to measured samples of air-dried soil. Ammonium nitrogen fertilizer was added to each with the inhibitor, and the water-content was brought up to 35%. The samples were then sealed and incubated at 20° C, and replicates removed after 1, 4, 8, 12 and 15 days. Each soil sample was then analyzed for $NH_4$—N and $NO_3$—N concentrations.

Method

Take a good loamy soil sample, air-dry at room temperature. Sieve through a 2mm sieve, take a sample, and perform a Dry Matter %. Divide the sample into twenty-five 20 gm amounts, and place each 20 gms in a conical flask. To 20 samples add 2 cm$^3$ standard $(NH_4)_2SO_4$ solution and mix well. Bring the D.M.% to within 60% of the soil water-holding capacity (4 cm$^3$). Add the test inhibitors as liquids and mix well. Stopper the flasks and incubate at 20° C. Remove a duplicate sample after 1, 4, 8, 12 and 15 days, analyze for $NH_4$—N and $NO_3$—N concentrations, using acid extraction.

| Period | A Control No Inhibitor | B Control No Inhibitor No $(NH_4)_2SO_4$ | C | D | E |
|---|---|---|---|---|---|
| Day 1 | N+ | 0 | N+I | N+I | N+I |
| Day 4 | N+ | 0 | N+I | N+I | N+I |
| Day 8 | N+ | 0 | N+I | N+I | N+I |
| Day 12 | N+ | 0 | N+I | N+I | N+I |
| Day 15 | N+ | 0 | N+I | N+I | N+I |

N+ = $(NH_4)_2SO_4$ added
I = Inhibitor added

Inhibitors:
C—Potassium Ethyl Xanthate
D—Sodium Trithiocarbonate
E—Ammonium Trithiocarbonate
Standard solution of $(NH_4)_2SO_4$ = 1 g/liter = 0.21 g/liter N
1 cm$^3$ contains 200 ppm
2 cm$^3$ in 20 gms soil = 20 ppm (mg/l)
Inhibitor:
(a) Add 0.0002 gms per 20 gms. soil = 10 µg/gm soil.
(b) Make stock solutions of each inhibitor, eg. 0.02 gms/100 cm$^3$ H$_2$O.
(c) Add 1 cm$^3$ to the soil.
After 1 Day: number of cm$^3$ per conical flask (20 gms soil)

|  | A | B | C | D | E |
|---|---|---|---|---|---|
| Water | 5 | 7 | 4 | 4 | 4 |
| $(NH_4)_2SO_4$ | 2 | — | 2 | 2 | 2 |
| Inhibitor | — | — | 1 | 1 | 1 |

Repeat above levels for 4, 8, 12 and 15 days.

$NH_4$—N and $NO_3$—N Analysis for Nitrification-Inhibition Experiment

| Period | A $NH_4$—N mg/l | A $NO_3$—N mg/l | B $NH_4$—N mg/l | B $NO_3$—N mg/l | C $NH_4$—N mg/l | C $NO_3$—N mg/l | D $NH_4$—N mg/l | D $NO_3$—N mg/l | E $NH_4$—N mg/l | E $NO_3$—N mg/l |
|---|---|---|---|---|---|---|---|---|---|---|
| Day 1 | 11.2 | NIL | NIL | 1.4 | 5.6 | NIL | 14.0 | NIL | 18.2 | NIL |
| Day 4 | 26.6 | 2.8 | 4.2 | 1.4 | 21.0 | 2.8 | 26.6 | NIL | 21.0 | 2.8 |
| Day 8 | 9.8 | 23.8 | NIL | 2.8 | NIL | 2.8 | 16.8 | 4.2 | 4.2 | 5.6 |
| Day 12 | NIL | 12.61 | 1.4 | 5.6 | 12.61 | 11.21 | 18.21 | 5.6 | 29.42 | 4.2 |
| Day 15 | 5.6 | 9.81 | 4.2 | 2.8 | 5.6 | 15.41 | 15.41 | 7.0 | 25.21 | 3.36 |

Conclusion

In all cases, the inhibitors retarded the process of nitrification, compared with the control without inhibitor. This is shown by a reduction in the loss of $NH_4$—N over the 15-day period.

Nitrification-inhibition studies using Carbon disulphide-releasing compounds (Series 2)

A second series of experiments was carried out to test the potency of potassium ethyl xanthate, sodium trithiocarbonate and ammonium trithiocarbonate as nitrification-inhibitors with three different fertilizers, namely urea, ammonium sulphate and aqueous ammonia.

Each compound was incubated with soil/fertilizer mixtures. At intervals of 4 days, samples were removed and analyzed for ammonium- and nitrate-nitrogen. The results indicate that potassium ethyl-xanthate, sodium trithiocarbonate and ammonium trithiocarbonate are extremely efficient nitrification-inhibitors for ammonium-nitrogen-fertilizers such as liquid ammonia, ammonium sulphate and urea.

Experiments were conducted on a laboratory scale, to study the effects of the three compounds added individually to measured samples of air-dried soil (pH 6.2). The soil was sieved through a 2mm sieve, divided into seventy-five 20 gm. quantities, and placed into 100 cm$^3$ conical flasks. To four of the soils, 2 cm$^3$ of standard ammonium sulphate solution was added; this was well-mixed and repeated for the other two fertilizer treatments, namely urea and aqueous ammonia.

The dry matter content was brought to 60% of the soil water-holding capacity.

The inhibitors were added as liquids and mixed with the soil. The flasks were stoppered and incubated at 20° C for 15 days.

Duplicate samples were removed at 1, 4, 8, 11 and 15 day intervals, and analysed for ammonium-N and nitrate-N concentrations (KCl and HCl extraction), using the magnesium oxide and Devarda's alloy method of analysis.

Standard Fertilizer Solutions (a) Aqueous ammonia solution — take 2.85 cm³ of ammonia solution and make up to 1 liter with deionized water.

(b) Urea solution — take 2.0 gms. of pure urea, $NH_2.CO.NH_2$, and make up to 1 liter with deionized water.

(c) Ammonium sulphate solution — take 5.0 gms. of ammonium sulphate and make up to 1 liter with deionized water.

All chemicals used were "Analar" grade.

Inhibitor Solutions (d) Potassium ethyl xanthate

Dissolve 0.02 gm. of the solid in deionized water and make up to 100 cm³.

1 cm³ of this solution added to 20 gm. of soil = 10 mg/gm.

Sodium trithiocarbonate (e) Dissolve 0.02 gm. of the solid deionized water and make up to 100 cm³.

1 cm³ of this solution added to 20 gm. of soil = 10 μg/gm.

Ammonium trithiocarbonate (f) Dissolve 0.02 gm. of the solid deionized water and make up to 100 cm³.

1 cm³ of this solution added to 20 gm. of soil = 10 μg/gm.

| Fertilizer | Control + Fertilizer | Control (No Fertilizer) | K-Ethyl Xanthate | Sodium Tri-thiocarbonate | Ammonium Tri-thiocarbonate |
|---|---|---|---|---|---|
| Ammonium Sulphate | A | B | C | D | E |
| Aqueous Ammonia | A | B | C | D | E |
| Urea | A | B | C | D | E |

Analyze 1, 4, 8, 11 and 15 days after treatment.

Results

| Treatment | | mg/liter $NH_4$—N | | | | |
|---|---|---|---|---|---|---|
| | | Day 1 | Day 4 | Day 8 | Day 11 | Day 15 |
| Ammonium sulphate | A | 110.7 | 109.3 | 102.3 | 81.2 | 65.8 |
| " | B | 21.0 | 22.4 | 14.0 | 4.2 | 14.0 |
| " | C | 106.5 | 121.9 | 116.3 | 95.3 | 124.7 |
| " | D | 109.3 | 116.3 | 121.9 | 120.5 | 127.5 |
| " | E | 113.5 | 113.5 | 120.5 | 106.5 | 134.5 |
| Ammonium hydroxide | A | 63.0 | 71.4 | 44.8 | 49.0 | 25.2 |
| " | B | 16.8 | 21.0 | 12.6 | 1.4 | 5.6 |
| " | C | 70.0 | 81.2 | 81.2 | 71.4 | 91.0 |
| " | D | 67.2 | 84.0 | 75.6 | 81.2 | 84.0 |
| " | E | 61.6 | 79.8 | 88.2 | 81.2 | 85.4 |
| Urea | A | 79.8 | 109.3 | 71.4 | 89.6 | 78.4 |
| " | B | 11.2 | 21.0 | 19.6 | 2.8 | 1.4 |
| " | C | 81.2 | 107.9 | 114.9 | 106.5 | 110.7 |
| " | D | 81.2 | 103.6 | 105.1 | 93.9 | 117.7 |
| " | E | 84.0 | 113.5 | 112.1 | 105.1 | 121.9 |

| Treatment | | mg/liter $NO_3$—N | | | | |
|---|---|---|---|---|---|---|
| | | Day 1 | Day 4 | Day 8 | Day 11 | Day 15 |
| Ammonium sulphate | A | 9.8 | 8.4 | 12.6 | 43.4 | 58.8 |
| " | B | 14.0 | 14.0 | 28.0 | 30.8 | 32.2 |
| " | C | 9.8 | 7.0 | 12.6 | 32.2 | 15.4 |
| " | D | 23.8 | 8.4 | 7.0 | 7.0 | 12.6 |
| " | E | 11.2 | 8.4 | 8.4 | 12.6 | 14.0 |
| Ammonium hydroxide | A | 9.8 | 12.6 | 33.6 | 22.4 | 67.2 |
| " | B | 22.4 | 9.8 | 30.8 | 30.8 | 43.4 |
| " | C | 11.2 | 7.0 | 8.4 | 12.6 | 9.8 |
| " | D | 12.6 | 5.6 | 5.6 | 8.4 | 7.0 |
| " | E | 8.4 | 5.6 | 4.2 | 4.2 | 14.0 |
| Urea | A | 9.8 | 2.8 | 39.2 | 28.0 | 40.6 |
| " | B | 8.4 | 9.8 | 4.2 | 36.4 | 39.2 |
| " | C | 9.8 | 15.4 | 2.8 | 7.0 | 8.4 |
| " | D | 9.8 | 2.8 | 1.4 | 22.4 | 7.0 |
| " | E | 7.0 | 8.4 | 5.6 | 4.2 | 7.0 |

Discussion

From the results it appears that a degree of nitrification-inhibition has been achieved using the compounds C, D and E.

Successful inhibition is revealed by a reduced or negligible increase in nitrate-N and a reduced or negligible decrease in ammonium-N during the period of the experiment.

To observe any nitrification occurring in the soil, controls A and B (with and without fertilizer and both without inhibitor), were run alongside those containing fertilizer and inhibitor.

The lines A (with fertilizer, without inhibitor) clearly show the process of nitrification, ie. an increase in the nitrate-N and a reduction in the ammonium-N concentrations.

The lines B (ie. soil with no fertilizer and no inhibitor) show an increase in nitrate-N and a slight reduction in ammonium-N.

The lines C, D and E show maintained levels of ammonium-N and nitrate-N, indicating successful nitrification-inhibition by using potassium ethyl xanthate, sodium trithiocarbonate and ammonium trithiocarbonate.

I claim:

1. A method for inhibiting or suppressing the nitrification of ammonium-nitrogen in soil and preventing rapid loss of ammonium-nitrogen therefrom, which comprises the step of treating the soil, simultaneously with one or more ammonium-nitrogen fertilizers, or ammonium-nitrogen-containing fertilizers, with one or more nitrification-inhibiting compounds, selected from the group consisting of trithiocarbonates having the formula $X_2CS_3$ and xanthates having the formula XS.CS.OR, wherein X is Na, K or $NH_4$ and R is alkyl.

2. A method as claimed in claim 1, wherein the nitrification-inhibitor is selected from the group consisting of sodium-, potassium- and ammonium-trithiocarbonate.

3. A method as claimed in claim 1, wherein the nitrification-inhibitor is potassium ethyl xanthate.

4. A method as claimed in claim 1, wherein the fertilizer is selected from the group consisting of ammonia, ammonium hydroxide, ammonium salts and urea.

5. A fertilizer composition comprising one or more ammonium-nitrogen fertilizers, or ammonium-nitrogen-containing fertilizers, in admixture with one or more nitrification-inhibiting compounds selected from the group consisting of trithiocarbonates having the formula $X_2CS_3$ and xanthates having the formula XS.CS.OR wherein X is Na, K or $NH_4$ and R is alkyl.

6. A fertilizer composition as claimed in claim 5, wherein the nitrification-inhibitor is selected from the group consisting of sodium-, potassium- and ammonium-trithiocarbonate.

7. A fertilizer composition as claimed in claim 5, wherein the nitrification-inhibitor is potassium ethyl xanthate.

8. A fertilizer composition as claimed in claim 5, wherein the fertilizer is selected from the group consisting of ammonia, ammonium hydroxide, ammonium salts and urea.

9. A fertilizer composition as claimed in claim 8, wherein the fertilizer is a solid mixed fertilizer.

10. A fertilizer composition as claimed in claim 9, wherein the fertilizer is a sulphur-coated urea prill.

* * * * *